(12) United States Patent
Nagai et al.

(10) Patent No.: US 11,495,981 B2
(45) Date of Patent: Nov. 8, 2022

(54) METHOD FOR CHARGING BATTERY AND CHARGING SYSTEM

(71) Applicant: TOYOTA JIDOSHA KABUSHIKI KAISHA, Toyota (JP)

(72) Inventors: Hiroki Nagai, Aichi-ken (JP); Ryo Kanada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 17/097,258

(22) Filed: Nov. 13, 2020

(65) Prior Publication Data

US 2021/0152001 A1 May 20, 2021

(30) Foreign Application Priority Data

Nov. 15, 2019 (JP) .............................. JP2019-207256

(51) Int. Cl.
*H02J 7/00* (2006.01)
*B60L 53/62* (2019.01)
*B60L 53/66* (2019.01)
*B60L 58/12* (2019.01)
*H02J 7/04* (2006.01)

(52) U.S. Cl.
CPC ............ *H02J 7/0048* (2020.01); *B60L 53/62* (2019.02); *B60L 53/66* (2019.02); *B60L 58/12* (2019.02); *B60L 2240/547* (2013.01); *B60L 2240/549* (2013.01); *H02J 7/04* (2013.01)

(58) Field of Classification Search
CPC .......... H02J 7/0048; H02J 7/04; H02J 7/0047; H02J 7/00712; H02J 7/007192; H02J 7/1492; H02J 2310/48; H02J 7/00714; H02J 7/007188; B60L 53/62; B60L 53/66; B60L 58/12; B60L 2240/547; B60L 2240/549; B60L 53/00; Y02E 60/10; Y02T 10/70; Y02T 10/7072; Y02T 10/92; Y02T 90/12;
(Continued)

(56) References Cited

U.S. PATENT DOCUMENTS

2011/0012563 A1 1/2011 Paryani et al.
2011/0121786 A1 5/2011 Tsuruta et al.
(Continued)

FOREIGN PATENT DOCUMENTS

| JP | 2011024412 A | 2/2011 |
|----|---|---|
| JP | 2011113688 A | 6/2011 |
| JP | 2017010882 A | 1/2017 |

OTHER PUBLICATIONS

Sandeep S. Sebastian et al., "Adaptive fast charging methodology for commercial Li-ion batteries based on the internal resistance spectrum," Wiley, Energy Storage, 2020;2:e141, Feb. 16, 2020 https://onlinelibrary.wiley.com/doi/epdf/10.1002/est2.141.

*Primary Examiner* — Paul Dinh
(74) *Attorney, Agent, or Firm* — Dickinson Wright, PLLC

(57) ABSTRACT

A method for charging a battery that is a non-aqueous electrolyte secondary battery includes first and second steps. The first step is estimating an SOC of the battery based on at least one of a voltage and a current of the battery. The second step is, based on a relationship between the SOC of the battery and an entropy change $\Delta S$, determining a maximum charging current to the battery in accordance with the SOC of the battery such that the maximum charging current becomes larger as the entropy change of the battery becomes greater.

2 Claims, 9 Drawing Sheets

(58) Field of Classification Search
CPC ........ Y02T 90/14; Y02T 90/16; H01M 10/44; H01M 2220/20; H01M 10/48
USPC ........................................................ 320/149
See application file for complete search history.

(56) References Cited

U.S. PATENT DOCUMENTS

2017/0149256 A1* 5/2017 Srinivasan ............ H01M 10/48
2017/0229891 A1* 8/2017 Lee ................... H02J 7/007192

* cited by examiner

| | SOC REGION | LOW SOC REGION | MEDIUM SOC REGION | HIGH SOC REGION | RESISTANCE CHANGE RATE [%] |
|---|---|---|---|---|---|
| | ΔS | NEGATIVE | POSITIVE | NEGATIVE | |
| | | $I_L$ | $I_M$ | $I_H$ | |
| CHARGING CURRENT [C] | EXAMPLE 1 | 1.5 | 2.0 | 1.0 | 110 |
| | EXAMPLE 2 | 1.5 | 2.0 | 1.5 | 112 |
| | EXAMPLE 3 | 1.5 | 2.0 | 1.2 | 111 |
| | EXAMPLE 4 | 1.2 | 2.3 | 1.2 | 113 |
| | EXAMPLE 5 | 1.2 | 1.5 | 1.2 | 110 |
| | COMPARATIVE EXAMPLE 1 | 2.0 | 1.2 | 1.5 | 264 |
| | COMPARATIVE EXAMPLE 2 | 2.3 | 1.5 | 1.0 | 243 |

METHOD FOR CHARGING BATTERY AND CHARGING SYSTEM

This nonprovisional application is based on Japanese Patent Application No. 2019-207256 filed on Nov. 15, 2019 with the Japan Patent Office, the entire contents of which are hereby incorporated by reference.

BACKGROUND

Field

The present disclosure relates to a method for charging a battery and a charging system, and more particularly to the technique for controlling a charging current of a non-aqueous electrolyte secondary battery.

Description of the Background Art

In recent years, a vehicle having a non-aqueous electrolyte secondary battery (which is a lithium ion secondary battery and may be abbreviated as "battery" hereinafter) mounted thereon as a battery for traveling has been becoming popular. Under this situation, an increase in battery capacity has been under study. By increasing the capacity, an EV traveling distance (distance that can be traveled by the vehicle using electric power stored in the battery) of the vehicle can be lengthened. However, the time required for charging of the battery also becomes longer, which may lead to a reduction in user's convenience. Thus, in order to shorten the charging time, "quick charging" for charging a battery with a large current has been under development.

It is known that deterioration of a battery is likely to progress particularly during quick charging. Therefore, the technique for suppressing battery deterioration during quick charging has been proposed. For example, Japanese Patent Laying-Open No. 2011-024412 discloses a charging system that shortens the battery charging time while suppressing/eliminating an influence of quick charging on a cycle life.

SUMMARY

In order to extend a life of a battery, there is always a demand for the technique for suppressing deterioration of the battery due to charging (refer to, for example, Japanese Patent Laying-Open No. 2011-024412). As a result of earnest study, the inventors have found a method that allows effective suppression of deterioration of a battery due to charging.

The present disclosure has been made to solve the above-described problem, and an object of the present disclosure is to suppress deterioration of a non-aqueous electrolyte secondary battery due to charging.

(1) A method for charging a battery according to an aspect of the present disclosure is a method for charging a battery that is a non-aqueous electrolyte secondary battery. The method for charging the battery includes first and second steps. The first step is estimating an SOC of the battery based on at least one of a voltage and a current of the battery. The second step is, based on a relationship between the SOC of the battery and an entropy change of a battery reaction of the battery, determining a charging current to the battery in accordance with the SOC of the battery such that the charging current becomes larger as the entropy change of the battery becomes greater.

(2) The determining (second step) includes setting the charging current to be larger in an SOC region where the entropy change of the battery is positive than in an SOC region where the entropy change of the battery is negative.

(3) The entropy change of the battery is negative in a first SOC region, is positive in a second SOC region with higher SOC than that of the first SOC region, and is negative in a third SOC region with even higher SOC than that of the second SOC region. The determining (second step) includes setting the charging current to be larger when the SOC of the battery is included in the second SOC region than when the SOC of the battery is included in the first or third SOC region.

Although details are described below, deterioration of the battery due to charging is less likely to progress in the SOC region where the entropy change of the battery is great and the entropy change of the battery is positive than in the SOC region where the entropy change of the battery is negative. Therefore, in the SOC region where the entropy change of the battery is positive, the speed of progress of deterioration of the battery (specifically, an increase in internal resistance of the battery) can fall within a permissible range, even when the maximum charging current is set to be relatively large. Therefore, according to the method in (1) to (3) above, deterioration of the non-aqueous electrolyte secondary battery due to charging can be suppressed.

(4) The determining includes i) setting a C rate of the charging current to be 1.5 C or higher in an SOC region where the entropy change of the battery is positive, and ii) setting the charging current in an SOC region where the entropy change of the battery is positive to be 1.25 or more times as large as the charging current in the SOC region where the entropy change of the battery is negative.

According to the method in (4) above, based on results (see FIG. 13) of an evaluation test conducted by the inventors, a numerical range of the C rate of the charging current is defined to be more than 1.5 C or less than 1.5 C, and a numerical range of a ratio of the charging current among the SOC regions is defined. As a result, deterioration of the non-aqueous electrolyte secondary battery due to charging can be suppressed more suitably.

(5) A method for charging a battery according to another aspect of the present disclosure is a method for charging a battery that is a non-aqueous electrolyte secondary battery. The method for charging the battery includes first and second steps. The first step is estimating an SOC of the battery based on at least one of a voltage and a current of the battery. The second step is, based on a relationship between the SOC of the battery and an entropy change of a battery reaction of the battery, determining a charging current to the battery in accordance with the SOC of the battery. The charging current to the battery when the entropy change of the battery is a first value is larger than the charging current when the entropy change of the battery is a second value smaller than the first value.

According to the method in (5) above, deterioration of the non-aqueous electrolyte secondary battery due to charging can be suppressed, similarly to the method in (1) above.

(6) A charging system according to still another aspect of the present disclosure includes: a battery that is a non-aqueous electrolyte secondary battery; a charging device that charges the battery; and a controller that controls a charging current to the battery. The controller estimates an SOC of the battery based on at least one of a voltage and a current of the battery. Based on a relationship between the SOC of the battery and an entropy change of a battery reaction of the battery, the controller determines the charging current in accordance with the SOC of the battery such that the charging current becomes larger as the entropy change of the battery becomes greater.

According to the configuration in (6) above, deterioration of the non-aqueous electrolyte secondary battery due to charging can be suppressed, similarly to the method in (1) or (5) above.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
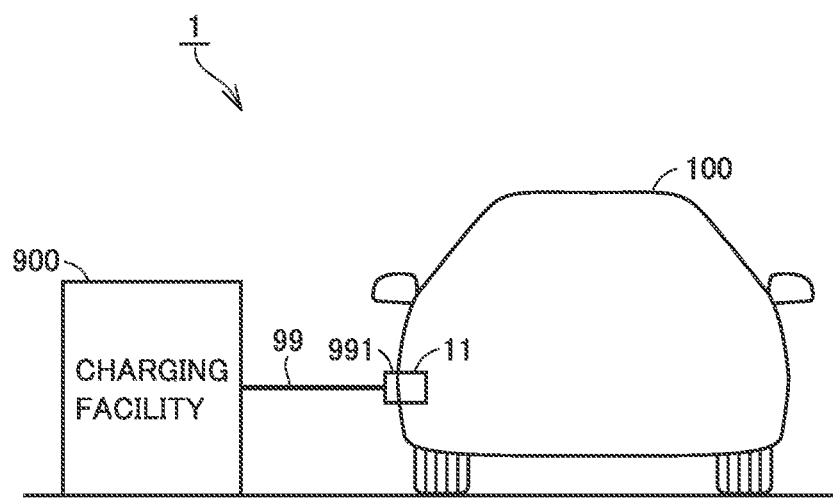
FIG. 1 schematically shows an overall configuration of a charging system according to an embodiment of the present disclosure.

An embodiment of the present disclosure will be described in detail hereinafter with reference to the drawings, in which the same or corresponding portions are denoted by the same reference characters and description thereof will not be repeated. In the embodiment described below, a charging system according to the present disclosure is used to charge a non-aqueous electrolyte secondary battery mounted on a vehicle. However, applications of the charging system according to the present disclosure are not limited to the use in a vehicle, and the charging system according to the present disclosure may be fixed, for example.

EMBODIMENT

<Configuration of Vehicle>

FIG. 1 schematically shows an overall configuration of a charging system according to an embodiment of the present disclosure. Referring to FIG. 1, a charging system 1 includes a vehicle 100 and a charging facility (such as a charging stand) 900 provided outside vehicle 100.

Vehicle 100 is typically a plug-in hybrid vehicle (PHV). Vehicle 100 performs "plug-in charging" for charging a battery 2 (see FIG. 2) mounted on vehicle 100, using electric power supplied from charging facility 900 through a charging cable 99. However, vehicle 100 is not limited to the plug-in hybrid vehicle, and may be any other type of electric powered vehicle that performs plug-in charging. Specifically, vehicle 100 may be an electric vehicle (EV), or may be a plug-in fuel cell vehicle (PFCV).

Figure 2:
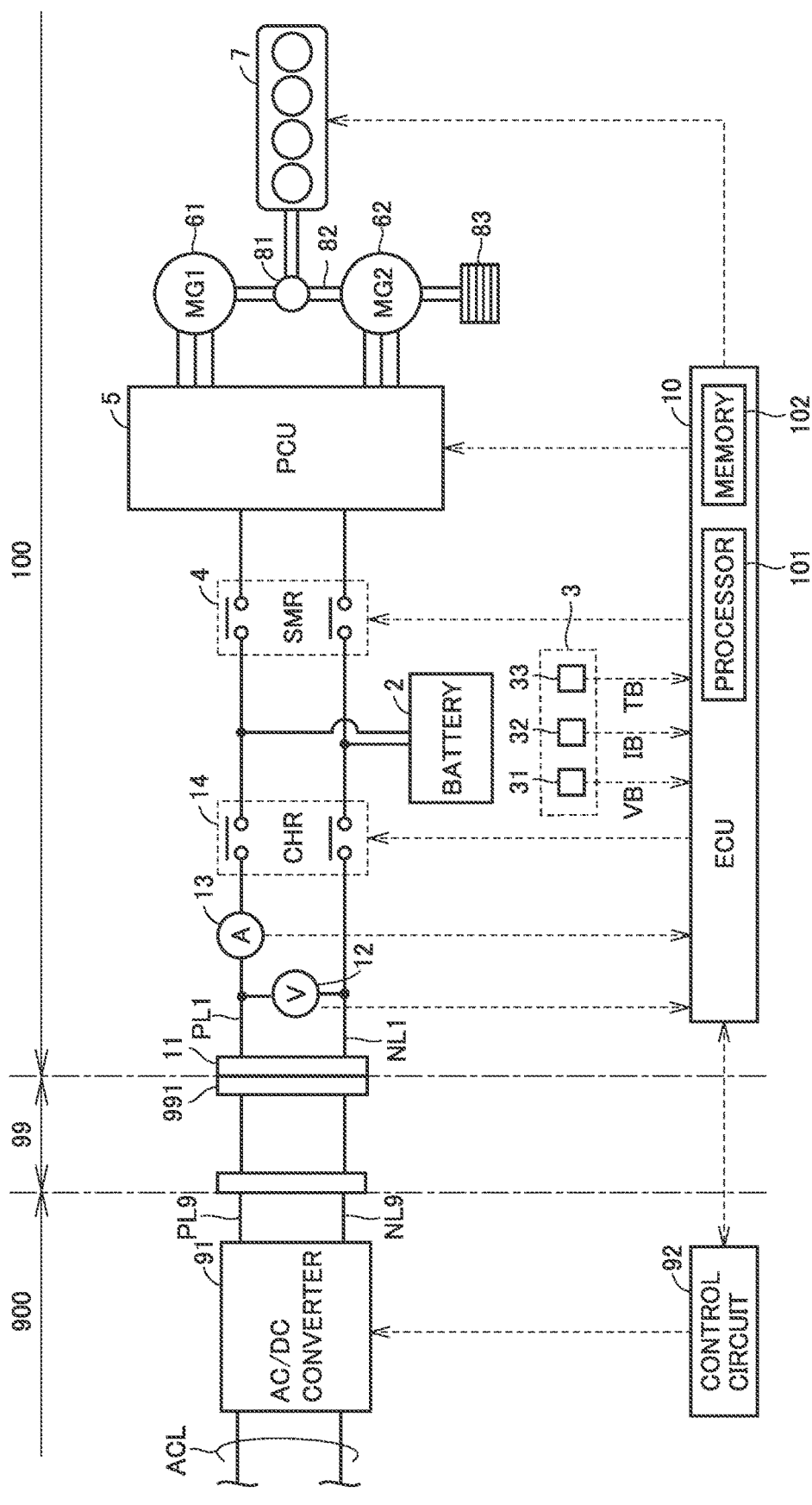
FIG. 2 schematically shows configurations of a vehicle and a charging facility according to the present embodiment.

FIG. 2 schematically shows configurations of vehicle 100 and charging facility 900 according to the present embodiment. In the present embodiment, charging facility 900 is a charger that performs direct current (DC) charging, and is adapted to so-called "quick charging". Charging facility 900 converts AC power supplied from a power supply system (not shown) into high-voltage DC power that can be charged to vehicle 100. Charging facility 900 includes a power line ACL, an AC/DC converter 91, power feeding lines PL9 and NL9, and a control circuit 92.

Power line ACL is electrically connected to the power supply system. Power line ACL transmits the AC power from the power supply system to AC/DC converter 91.

AC/DC converter 91 converts the AC power on power line ACL into DC power for charging battery 2 mounted on vehicle 100. The power conversion by AC/DC converter 91 may be performed by a combination of AC/DC conversion for power factor improvement and DC/DC conversion for voltage level adjustment. The DC power output from AC/DC converter 91 is supplied to power feeding line PL9 on the positive electrode side and power feeding line NL9 on the negative electrode side. AC/DC converter 91 corresponds to "charging device" according to the present disclosure.

Control circuit 92 includes a processor, a memory, and an input and output port (all are not shown). Control circuit 92 controls the power conversion operation by AC/DC converter 91, based on a voltage between power feeding line PL9 and power feeding line NL9, communication with vehicle 100, and a map and a program stored in the memory.

Vehicle 100 includes an inlet 11, charging lines PL1 and NL1, a voltage sensor 12, a current sensor 13, a charging relay 14, battery 2, a monitoring unit 3, a system main relay (SMR) 4, a power control unit (PCU) 5, motor generators 61 and 62, an engine 7, a power split device 81, a drive shaft 82, a drive wheel 83, and an electronic control unit (ECU) 10.

A connector 991 provided at a tip of charging cable 99 is connected to inlet 11. More specifically, connector 991 is inserted into inlet 11 with mechanical coupling such as fitting, so that electrical connection between power feeding line PL9 of charging cable 99 and a positive-electrode-side contact point of inlet 11 is ensured and electrical connection between power feeding line NL9 and a negative-electrode-side contact point of inlet 11 is ensured. Furthermore, when charging cable 99 is connected to inlet 11, ECU 10 of vehicle 100 and control circuit 92 of charging facility 900 can mutually receive and transmit various types of signals, instructions and data. Communication in accordance with a prescribed communication standard such as CAN (Controller Area Network) or communication using an analog signal through an analog control line can be used as the above-described bidirectional communication.

Charging lines PL1 and NL1 are provided between inlet 11 and battery 2, and transmits the DC power from inlet 11 to battery 2.

Between inlet 11 and charging relay 14, voltage sensor 12 is electrically connected between charging line PL1 and charging line NL1. Voltage sensor 12 detects a voltage between charging line PL1 and charging line NL1, and outputs the result of detection to ECU 10. Between inlet 11 and charging relay 14, current sensor 13 is electrically connected to charging line PL1. Current sensor 13 detects a current flowing through charging line PL1, and outputs the result of detection to ECU 10. Based on the results of detection by voltage sensor 12 and current sensor 13, ECU 10 can calculate supply power (including a supply current) from charging facility 900 to vehicle 100.

Charging relay 14 is electrically connected to charging lines PL1 and NL1. Charging relay 14 is opened/closed in accordance with a control instruction from ECU 10. When charging relay 14 is closed, power transmission from inlet 11 to battery 2 becomes possible.

Battery 2 is a battery pack including a plurality of cells 21. Each cell 21 is a non-aqueous electrolyte secondary battery, i.e., a lithium ion battery. Battery 2 stores electric power for driving motor generators 61 and 62, and supplies electric power to motor generators 61 and 62 through PCU 5. Furthermore, battery 2 is charged with the supply power from charging facility 900 during plug-in charging of vehicle 100. In addition, battery 2 receives generated electric power through PCU 5 and is charged with the generated electric power during power generation by motor generators 61 and 62.

Monitoring unit 3 includes a voltage sensor 31, a current sensor 32 and a temperature sensor 33. Voltage sensor 31 measures a voltage VB of each of the plurality of cells 21. Current sensor 32 measures a current IB input and output to and from battery 2. Temperature sensor 33 measures a temperature TB of each block (module) composed of a plurality of cells 21. Each sensor outputs a signal indicating the result of measurement to ECU 10. Based on the signal from voltage sensor 31 and/or the signal from current sensor 32, ECU 10 estimates a state of charge (SOC) of battery 2.

A unit of monitoring by each sensor in monitoring unit 3 is not particularly limited. The unit of monitoring may be, for example, a cell unit or a block unit. In the following description, for ease of understanding, battery 2 as a whole will be regarded as the unit of monitoring, without particularly taking an internal configuration of battery 2 into consideration.

SMR 4 is electrically connected to a power line that connects battery 2 and PCU 5. SMR 4 switches between supply and cut-off of electric power between battery 2 and PCU 5 in accordance with a control instruction from ECU 10.

PCU 5 performs bidirectional power conversion between battery 2 and motor generators 61 and 62 in accordance with a control instruction from ECU 10. PCU 5 controls states of motor generators 61 and 62 individually. PCU 5 includes, for example, two inverters and a converter (all are not shown). The two inverters are provided to correspond to motor generators 61 and 62. The converter boosts a DC voltage supplied to each inverter to a voltage equal to or higher than an output voltage of battery 2.

Each of motor generators 61 and 62 is an AC rotating electric machine, and is a three-phase AC synchronous motor including a rotor in which a permanent magnet (not shown) is embedded, for example. Motor generator 61 is mainly used as a generator driven by engine 7 through power split device 81. Electric power generated by motor generator 61 is supplied to motor generator 62 or battery 2 through PCU 5. Motor generator 62 operates mainly as a motor. Motor generator 62 is driven by at least one of the electric power from battery 2 and the electric power generated by motor generator 61, and the driving force of motor generator 62 is transmitted to drive shaft 82. In contrast, during braking of vehicle 100 or during reduction in acceleration on a downward slope, motor generator 62 operates as a generator and performs regenerative power generation. Electric power generated by motor generator 62 is supplied to battery 2 through PCU 5.

Engine 7 is, for example, a gasoline engine or a diesel engine. Engine 7 outputs motive power by converting combustion energy generated when a mixture of air and fuel is burned into kinetic energy of movable elements such as a piston and a rotor.

Power split device 81 includes, for example, a planetary gear mechanism (not shown) having three rotation shafts of a sun gear, a carrier and a ring gear. Power split device 81 splits the motive power output from engine 7 into motive power for driving motor generator 61 and motive power for driving drive wheel 83.

Similarly to control circuit 92 of charging facility 900, ECU 10 includes a processor 101 such as a central processing unit (CPU), a memory 102 such as a read only memory (ROM) and a random access memory (RAM), and an input and output port (not shown) for inputting and outputting various types of signals. ECU 10 performs various types of processes for controlling vehicle 100 to a desired state, based on the signal received from each sensor and the program and the map stored in memory 102.

More specifically, during plug-in charging of vehicle 100, ECU 10 communicates with control circuit 92 of charging facility 900 through charging cable 99, and adjusts power supply from charging facility 900 to vehicle 100. As a result, charging control for battery 2 is implemented. During traveling of vehicle 100, ECU 10 outputs a control instruction to PCU 5 and engine 7, to thereby control charging and discharging of battery 2. Details of charging control for battery 2 will be described below.

ECU 10 may be divided into a plurality of ECUs for each function. For example, ECU 10 can be divided into a battery ECU that monitors a state of battery 2, an HVECU that controls PCU 5, and an engine ECU that controls engine 7 (all are not shown).

ECU 10 corresponds to "controller" according to the present disclosure. However, control circuit 92 on the charging facility 900 side may be "controller" according to the present disclosure. Alternatively, both ECU 10 and control circuit 92 may be "controller" according to the present disclosure.

The configuration of "charging system" according to the present disclosure is not limited to the configuration example shown in FIG. 2. For example, when vehicle 100 is adapted to AC charging (so-called normal charging), a charger that performs AC/DC conversion may be provided in vehicle 100 in place of charging facility 900.

<Configuration of Cell>

Figure 3:
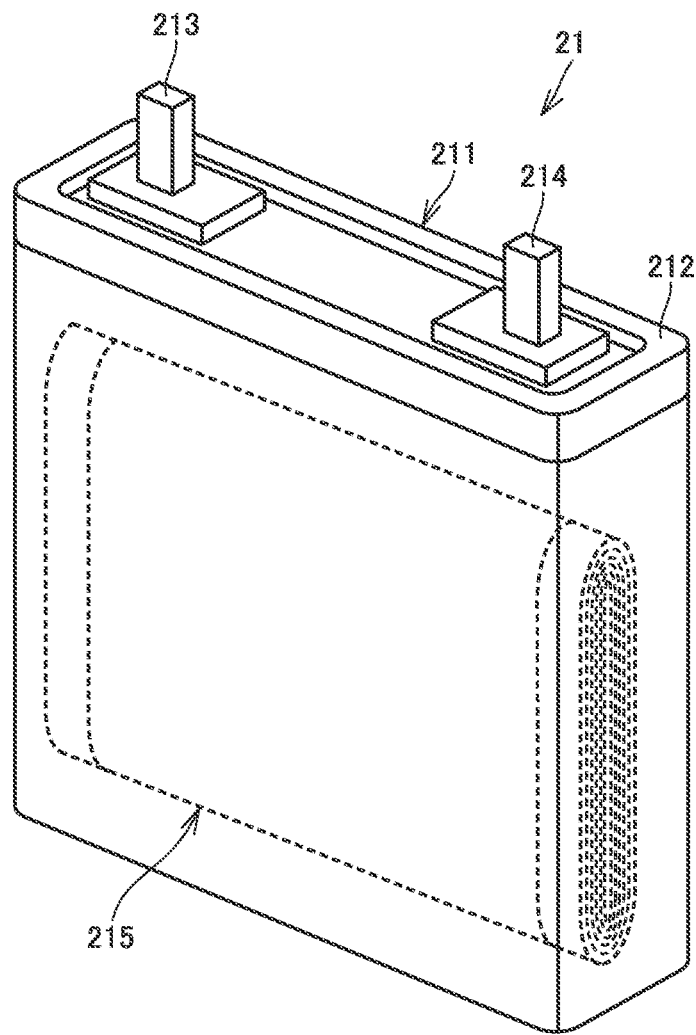
FIG. 3 is a diagram for illustrating a configuration of a cell in more detail.

FIG. 3 is a diagram for illustrating a configuration of cell 21 in more detail. Cell 21 in FIG. 3 is shown such that the interior thereof can be viewed in a see-through manner.

Referring to FIG. 3, cell 21 includes a battery case 211 having, for example, a rectangular shape (substantially rectangular parallelepiped shape). An upper surface of battery case 211 is sealed by a lid 212. One end of each of a positive electrode terminal 213 and a negative electrode terminal 214 protrudes from lid 212 to the outside. The other ends of positive electrode terminal 213 and negative electrode terminal 214 are connected to an internal positive electrode terminal and an internal negative electrode terminal (both are not shown), respectively, in battery case 211. An electrode assembly 215 is accommodated in battery case 211. Electrode assembly 215 is formed by stacking a positive electrode and a negative electrode with a separator interposed therebetween, to thereby obtain a stacked body, and winding the stacked body. An electrolyte is retained in the positive electrode, the negative electrode and the separator.

A configuration and a material that are conventionally known as a positive electrode, a separator and an electrolyte of a lithium ion secondary battery can be used for the positive electrode, the separator and the electrolyte. By way of example, a ternary (Li(Ni—Mn—Co)O$_2$) material obtained by replacing a part of lithium cobalt oxide (LiCoO$_2$) with nickel and manganese can be used for the positive electrode.

A carbon-based material (such as black lead or graphite) can be used for the negative electrode. Alternatively, a composite electrode of a carbon-based material and a silicon-based material (Si or SiO) may be used for the negative electrode. In this case, a content of the carbon-based material (specifically, black lead) is preferably not less than 80 [wt %].

Polyolefin (e.g., polyethylene or polypropylene) can be used for the separator. The electrolyte includes an organic solvent (e.g., a mixed solvent of dimethyl carbonate (DMC) and ethyl methyl carbonate (EMC) and ethylene carbonate (EC)), a lithium salt (e.g., LiPF$_6$), an additive (e.g., lithium bis(oxalate)borate (LiBOB) or Li[PF$_2$(C$_2$O$_4$)$_2$]), and the like.

The configuration of the cell is not limited to the above-described example. For example, the electrode assembly may have a stacked structure, not a wound structure. In addition, the battery case is not limited to the rectangular-shaped battery case, and a cylindrically-shaped battery case or a battery case of a laminate type can also be used.

In charging system 1 configured as described above, there is a demand for suppressing deterioration of battery 2 due to charging. When emphasis is placed on suppression of deterioration of battery 2, a charging current to battery 2 during plug-in charging is set to be sufficiently small. In this case, however, the charging time may become longer and the user's convenience may decrease. In contrast, when emphasis is placed on a reduction in charging time and the charging current is set to be excessively large, a rate of increase (degree of increase) in internal resistance of battery 2 may become too fast and deterioration of battery 2 may progress. As a result of study, the inventors have found that deterioration of battery 2 can be suitably suppressed by determining the charging current to battery 2 in accordance with an entropy change ΔS of battery 2. This charging control technique will be described in detail below.

<Measurement of Entropy Change>

Generally, Gibbs energy G is expressed like the following Equation (1), using enthalpy H, entropy S and a temperature (absolute temperature) T. Entropy S in a lithium ion battery is a parameter related to a degree of freedom of arrangement of a lithium ion and a site (vacancy) in an electrode material in a battery reaction (intercalation reaction).

$$G=H-TS \quad (1)$$

By total differentiation of both sides of Equation (1) above, the following Equation (2) is obtained:

$$dG=dH-(TdS+SdT) \quad (2).$$

With regard to enthalpy H (=U+PV) (P: pressure, V: volume), the relationship of dH=TdS+TdP is established, and thus, this relationship is substituted into Equation (2) above. This leads to the following Equation (3):

$$dG=VdP-SdT \quad (3).$$

By differentiating Equation (3) above with respect to temperature T under constant pressure P, the following Equation (4) is obtained:

$$(\partial G/\partial T)_P=-S \quad (4).$$

By transformation of Equation (4) above, the following Equation (5) is obtained:

$$\Delta S=-d(\Delta G)/dT \quad (5).$$

In addition, the following Equation (6) is established between electromotive force $E_{emp}$ of the battery and reaction Gibbs energy ΔG. In Equation (6), the number of charges involved in the battery reaction is indicated by "n". Since a charge transfer reaction of the lithium ion battery is a one-electron reaction, the relationship of n=1 is established. Faraday constant F can be set at F=96485 [C/mol (=s·A/mol)].

$$\Delta G=-nFE_{emp} \quad (6)$$

Based on Equations (5) and (6) above, entropy change ΔS of the lithium ion battery can be expressed like the following Equation (7). Electromotive force $E_{emp}$ of the battery can be replaced with an open circuit voltage (OCV) of the lithium ion battery.

$$\Delta S=nF(dE_{emp}/dT) \quad (7)$$

Figure 4:
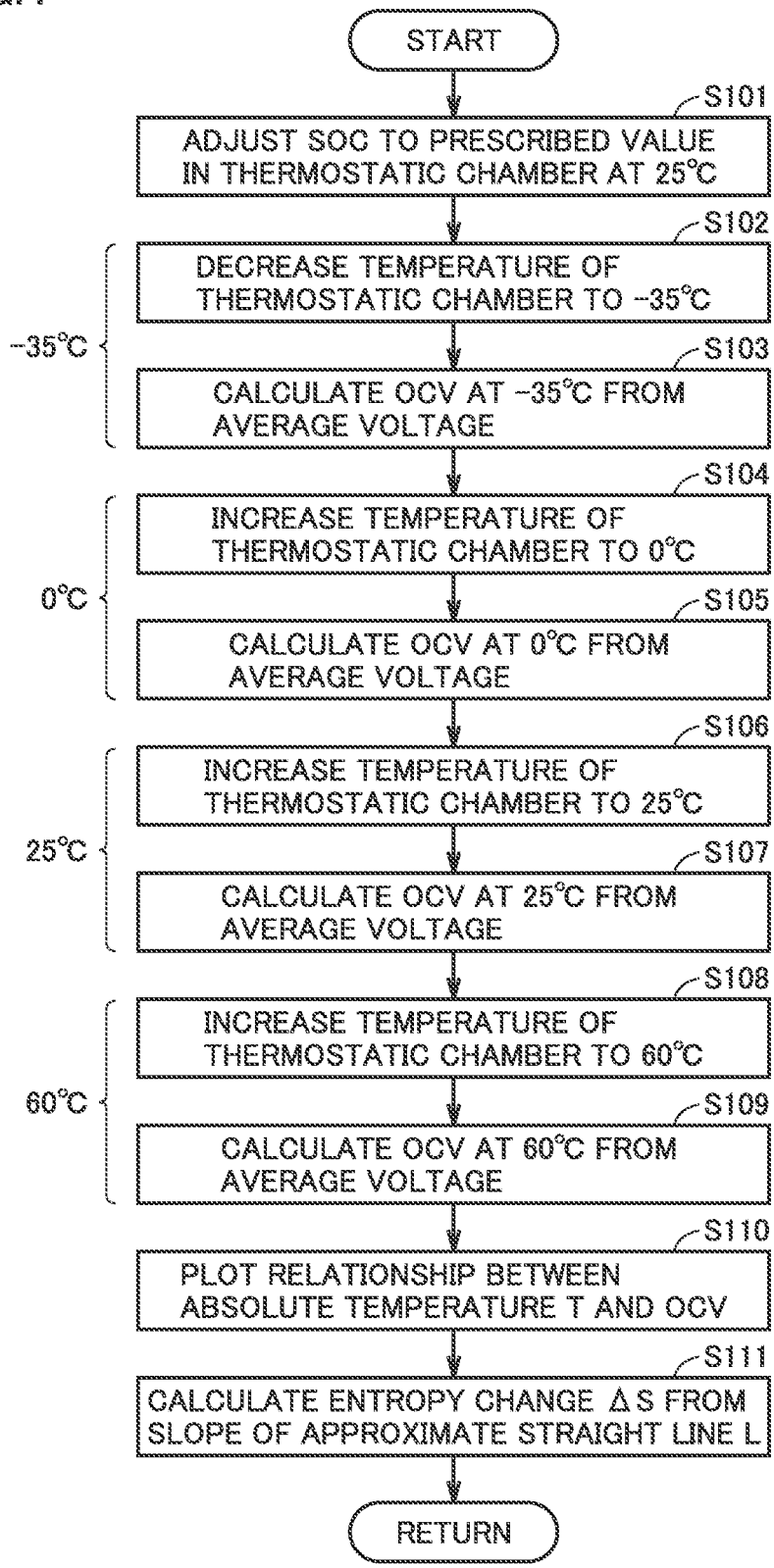
FIG. 4 is a flowchart showing a method for measuring an entropy change of a battery.

FIG. 4 is a flowchart showing a method for measuring entropy change ΔS of battery 2. A specific procedure for using one of the plurality of cells 21 forming battery 2 and measuring entropy change ΔS of the cell (hereinafter, referred to as "target cell") will now be described. By taking the number of the cells included in battery 2, a connection relationship between the cells, or the like into consideration, entropy change ΔS of battery 2 can be calculated from entropy change ΔS of the target cell.

Referring to FIG. 4, first, the target cell is placed in a thermostatic chamber maintained at room temperature (25° C.). Furthermore, the SOC of the target cell is adjusted to a predetermined value (in the examples described with reference to FIGS. 5 and 6, SOC=15% and 50%, respectively) (S101).

Next, in a state where the target cell is placed in the thermostatic chamber, the temperature of the thermostatic chamber is reduced to −35° C. (S102). During a time period until about 3.5 to 4 hours elapse after the temperature of the thermostatic chamber reaches −35° C., the voltage of the target cell is measured every prescribed time (e.g., every 5 minutes). An average value of the measured voltages is defined as the OCV of the target cell at −35° C. (S103).

Then, in a state where the target cell is placed in the thermostatic chamber, the temperature of the thermostatic chamber is raised to 0° C. (S104). During a time period until 3.5 to 4 hours elapse after the temperature of the thermostatic chamber reaches 0° C., the voltage of the target cell is measured every 5 minutes. An average value of the measured voltages is defined as the OCV of the target cell at 0° C. (S105).

Similarly, in a state where the target cell is placed in the thermostatic chamber, the temperature of the thermostatic chamber is raised to 25° C. (S106). During a time period until 3.5 to 4 hours elapse after the temperature of the thermostatic chamber reaches 25° C., the voltage of the target cell is measured every 5 minutes. An average value of the measured voltages is defined as the OCV of the target cell at 25° C. (S107).

In a state where the target cell is placed in the thermostatic chamber, the temperature of the thermostatic chamber is raised to 60° C. (S108). During a time period until 3.5 to 4 hours elapse after the temperature of the thermostatic chamber reaches 60° C., the voltage of the target cell is measured every 5 minutes. An average value of the measured voltages is defined as the OCV of the target cell at 60° C. (S109).

In S110, the measurement results of the OCVs at the above-described different four temperatures are plotted on a graph in which the horizontal axis represents the temperature of the target cell and the vertical axis represents the OCV of the target cell.

Figure 5:
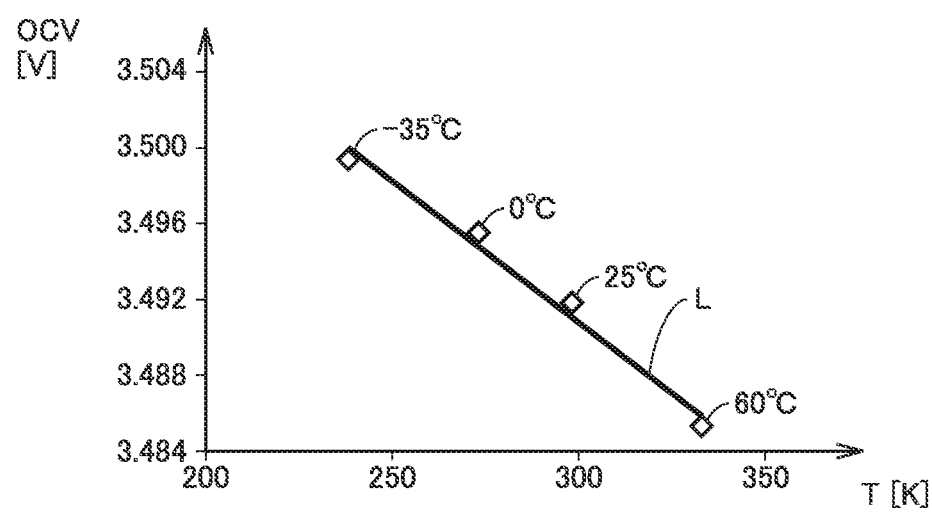
FIG. 5 shows a relationship between an absolute temperature and an OCV of a target cell at SOC=15%.
Figure 6:
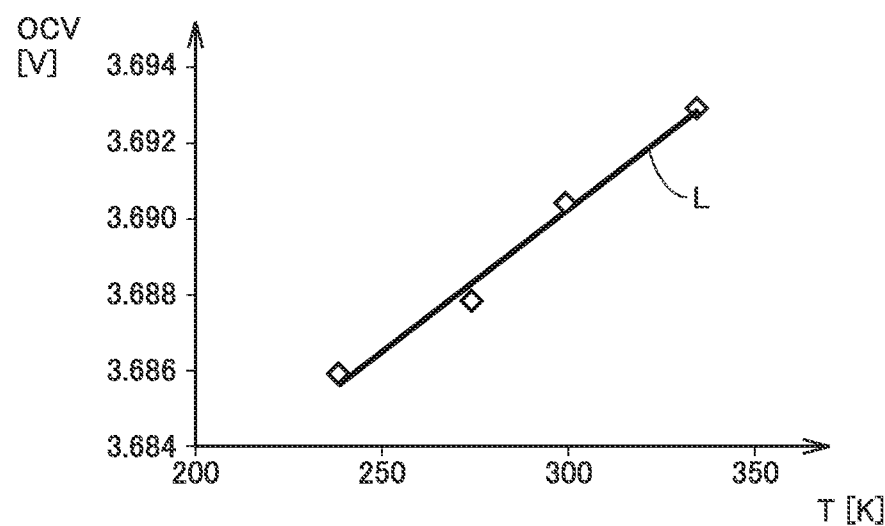
FIG. 6 shows a relationship between an absolute temperature and an OCV of a target cell at SOC=50%.

FIG. 5 shows a relationship between absolute temperature T and the OCV of the target cell at SOC=15%. FIG. 6 shows a relationship between absolute temperature T and the OCV of the target cell at SOC=50%. In FIGS. 5 and 6, the horizontal axis represents absolute temperature T of the target cell, and the vertical axis represents the OCV of the target cell. As shown in FIGS. 5 and 6, when the data (combination of absolute temperature T and the OCV of the target cell) measured in S102 to S109 is plotted, the data is distributed linearly.

Referring again to FIG. 4, in S111, the data plotted in S110 is approximated by a straight line, to thereby calculate a slope of an approximate straight line L. The slope ($=dE_{emp}/dT$) of approximate straight line L is equal to $\Delta S/nF$ based on Equation (7) above. Therefore, entropy change $\Delta S$ can be calculated from the slope of approximate straight line L.

Since Faraday constant F is a positive value, positive/negative of the slope of approximate straight line L matches a sign of entropy change $\Delta S$. When SOC=15% (see FIG. 5), the slope of approximate straight line L is negative and entropy change $\Delta S$ at this time is also negative. In contrast, when SOC=50% (see FIG. 6), the slope of approximate straight line L is positive and entropy change $\Delta S$ at this time is also positive.

FIGS. 5 and 6 only show the calculation results of entropy change $\Delta S$ at the two SOCs. However, by measuring a correlation between absolute temperature T and the OCV for various SOCs and plotting the measurement results on a graph, the dependence of entropy change $\Delta S$ on the SOC can be obtained.

Figure 7:
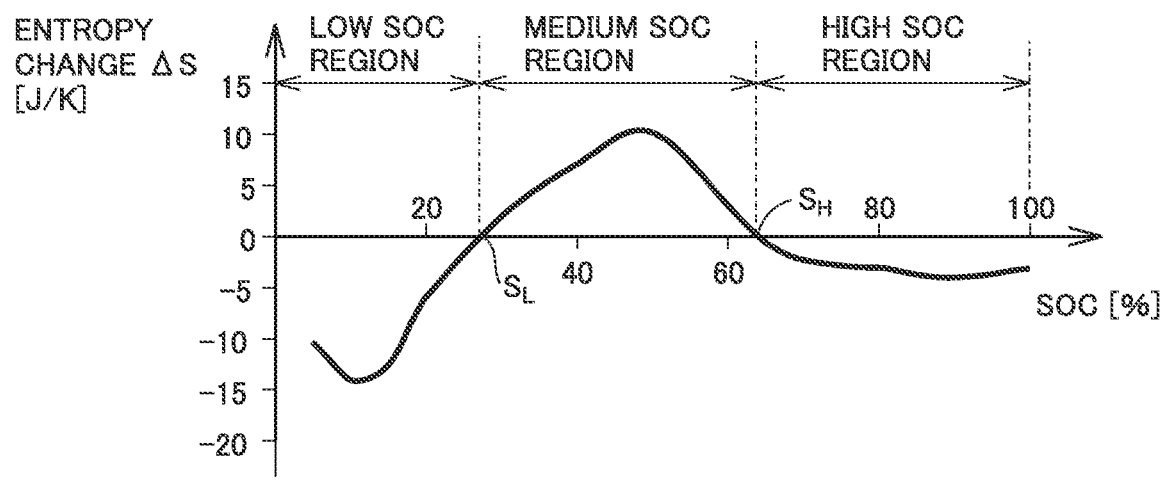
FIG. 7 shows one example of the dependence of the entropy change on an SOC of the battery.

FIG. 7 shows one example of the dependence of entropy change $\Delta S$ on the SOC of battery 2. In FIG. 7, the horizontal axis represents the SOC of battery 2, and the vertical axis represents entropy change $\Delta S$ of battery 2. When the SOC of battery 2 is $S_L$ or $S_H$ (where $S_L<S_H$), entropy change $\Delta S$ of battery 2 is 0. In the example shown in FIG. 7, $S_L$=about 25% and $S_H$=about 65%.

When the SOC of battery 2 is in a medium SOC region (SOC region that is between $S_L$ and $S_H$), entropy change $\Delta S$ is positive. In contrast, when the SOC of battery 2 is in a low SOC region (SOC region that is less than $S_L$) or a high SOC region (SOC region that is more than $S_H$), entropy change $\Delta S$ is negative. The low SOC region, the medium SOC region and the high SOC region correspond to "first SOC region" to "third SOC region" according to the present disclosure, respectively.

<Control of Charging Current>

In the present embodiment, a maximum current (hereinafter, also referred to as "maximum charging current") Imax that can be charged to battery 2 is determined in accordance with entropy change $\Delta S$ of battery 2. As described with reference to FIGS. 4 to 7, the relationship between entropy change $\Delta S$ and the SOC of battery 2 can be preliminarily determined. Therefore, maximum charging current Imax to battery 2 can be determined in accordance with the SOC of battery 2.

Figure 8:
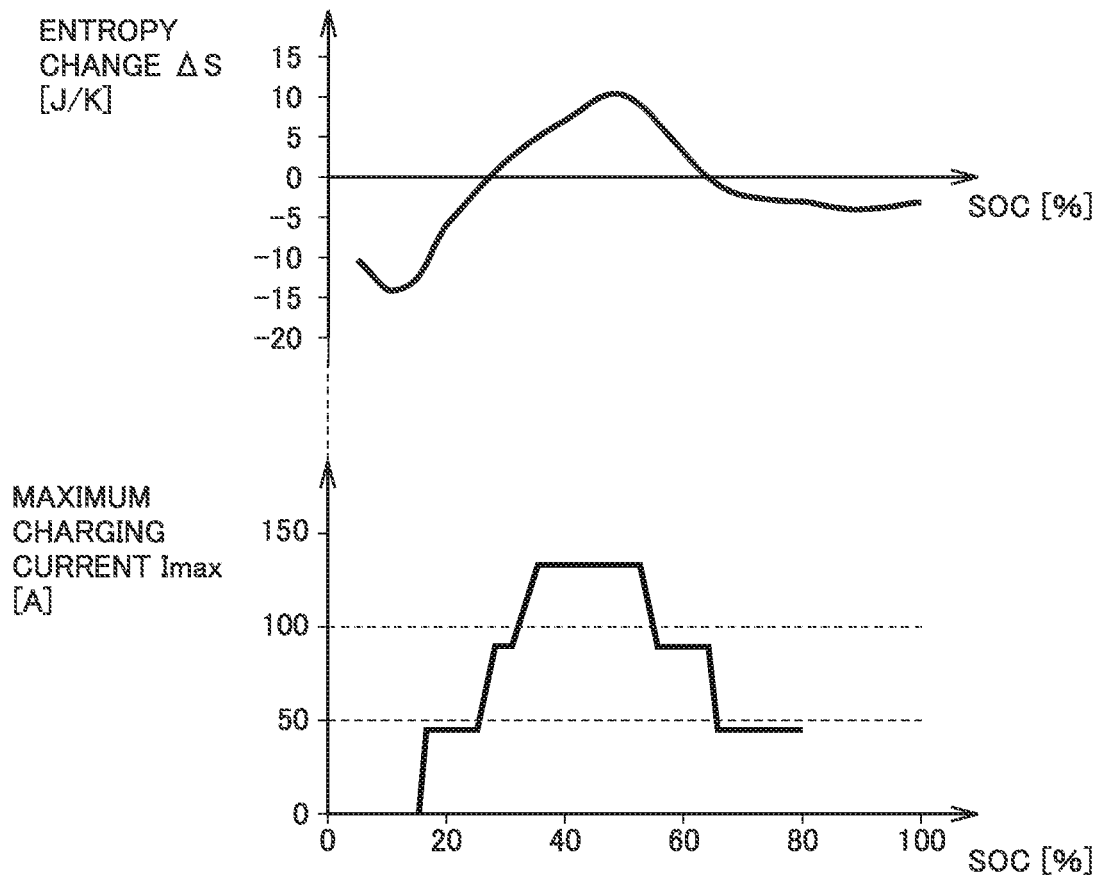
FIG. 8 shows a relationship between a maximum charging current to the battery and the SOC of the battery.

FIG. 8 shows a relationship between maximum charging current Imax to battery 2 and the SOC of battery 2. In FIG. 8 (and FIG. 12 described below), the horizontal axis represents the SOC [%] of battery 2. The vertical axis in the upper graph represents entropy change $\Delta S$ of battery 2. This corresponds to the graph described with reference to FIG. 7, for the sake of clarity. The vertical axis in the lower graph represents maximum charging current Imax [A] to battery 2. With regard to a sign of a current I input and output to and from battery 2, a direction of charging of battery 2 is defined as positive.

In the present embodiment, as shown in FIG. 8, maximum charging current Imax is determined to be larger as entropy change $\Delta S$ of battery 2 becomes greater. For example, maximum charging current Imax when the SOC of battery 2 is around 50% and entropy change $\Delta S$ is about 10 [J/K] (first value) is larger than maximum charging current Imax when the SOC of battery 2 is around 20% and entropy change $\Delta S$ of battery 2 is about $-5$ [J/K] (second value). In addition, maximum charging current Imax is larger in the SOC region (medium SOC region) where entropy change $\Delta S$ is positive than in the SOC region (low SOC region or high SOC region) where entropy change $\Delta S$ is negative. The relationship shown in FIG. 8 is preliminarily defined and stored in memory 102 of ECU 10.

As indicated in Equation (5) above, entropy change $\Delta S$ and temperature differentiation of reaction Gibbs energy $\Delta G$ are of opposite sign. Basically, during charging of battery 2, temperature TB of battery 2 increases with heat generation in battery 2 (dT>0). In this case, entropy change $\Delta S$ and a change in reaction Gibbs energy $\Delta G$ (d($\Delta G$)) are of opposite sign. Therefore, when entropy change $\Delta S$ is positive, reaction Gibbs energy $\Delta G$ decreases. Generally, the reaction of the decrease in reaction Gibbs energy $\Delta G$ is likely to occur spontaneously. In this example, specifically, the lithium ion in the electrolyte is likely to be taken into the negative electrode. As a result, an increase in internal resistance of battery 2 may be less likely to occur.

As described above, an increase in internal resistance of battery 2 is less likely to occur in the SOC region where entropy change $\Delta S$ is positive than in the SOC region where entropy change $\Delta S$ is negative. Therefore, in the SOC region where entropy change $\Delta S$ is positive, a rate of increase in internal resistance of battery 2 can fall within a permissible range, even when maximum charging current Imax is set to be relatively large. Therefore, according to the present embodiment, a reduction in charging time and suppression of deterioration of battery 2 due to charging can both be achieved.

<Charging Control Flow>

Figure 9:
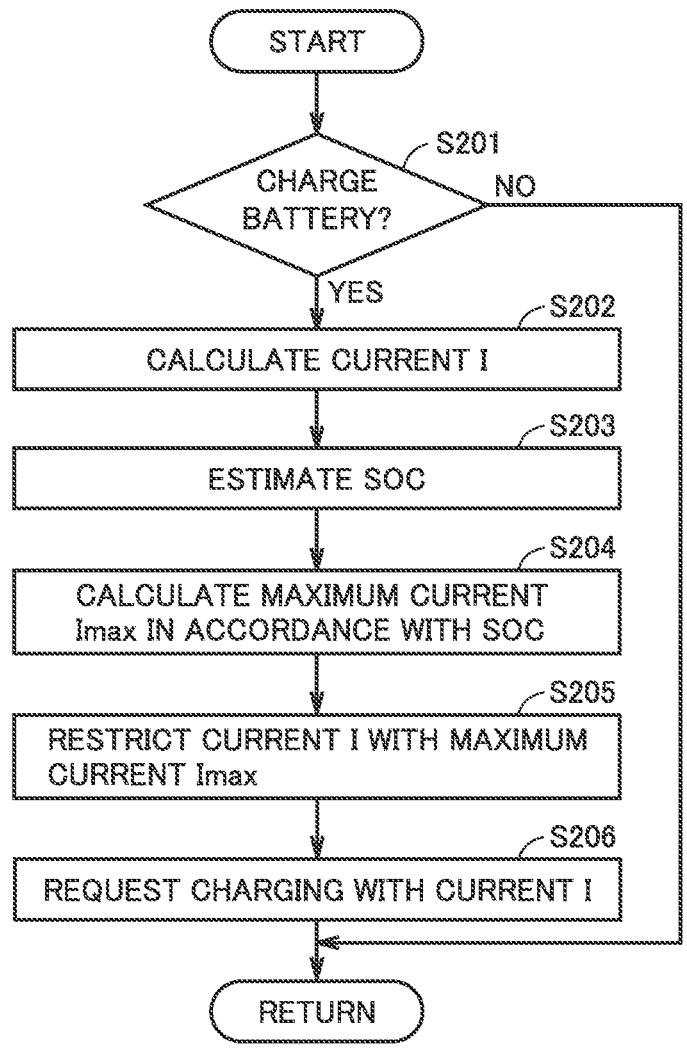
FIG. 9 is a flowchart showing a method for charging the battery according to the present embodiment.

FIG. 9 is a flowchart showing a method for charging battery 2 according to the present embodiment. This flowchart is invoked from a main routine (not shown) and performed every time a prescribed control period elapses. Each step is basically implemented by software processing by ECU 10. However, each step may be implemented by hardware processing by an electronic circuit formed in ECU 10. In the following description, each step will be abbreviated as "S".

In S201, ECU 10 determines whether or not to perform plug-in charging of battery 2. Specifically, when charging cable 99 is connected to inlet 11 (immediately before plug-in charging is started or when plug-in charging is in execution), ECU 10 can make a determination of YES in S201. When plug-in charging of battery 2 is not performed (NO in S201), ECU 10 skips the subsequent steps and returns the process to the main routine.

In S202, ECU 10 calculates current I to be charged to battery 2. More specifically, ECU 10 determines a pattern of the current charged to battery 2, based on negotiation with control circuit 92 of charging facility 900. Based on the determined current pattern, ECU 10 calculates charging current I at the current time (current to be charged).

In S203, ECU 10 estimates the SOC of battery 2 based on at least one of voltage VB and current IB of battery 2. A known method such as a method using a predetermined SOC-OCV characteristic curve or a method for summing the currents input and output to and from battery 2 can be used as a method for estimating the SOC.

In S204, ECU 10 determines maximum charging current Imax to battery 2 based on the SOC of battery 2, by referring to a map (see, for example, the lower graph in FIG. 8) indicating the relationship between the SOC of battery 2 and maximum charging current Imax. As a result, maximum charging current Imax to battery 2 is determined in accordance with entropy change ΔS of battery 2.

In S205, ECU 10 restricts charging current I to battery 2 with maximum charging current Imax. Specifically, when charging current I to battery 2 (value calculated in S202) is more than maximum charging current Imax, ECU 10 replaces charging current I to battery 2 with maximum charging current Imax (I=Imax). In contrast, when charging current I to battery 2 is less than maximum charging current Imax, ECU 10 uses charging current I to battery 2.

In S206, ECU 10 performs plug-in charging control of battery 2 such that charging current I restricted in S25 is charged to battery 2. For example, during plug-in charging of vehicle 100, a parameter about a charging condition for battery 2 is exchanged between vehicle 100 and charging facility 900. At this time, ECU 10 sets a current value (or a receivable maximum current value) that is required to be supplied from charging facility 900 to vehicle 100 at the value calculated in S205. Thereafter, the process is returned to the main routine, and thus, a series of process is repeated for each prescribed control period.

<Results of Evaluation Test>

Next, results of a test conducted to evaluate the method for charging battery 2 according to the present embodiment will be described. In this evaluation test, two batteries 2 each having the SOC adjusted to a prescribed value (in this example, 10%) were prepared. One battery 2 was repeatedly charged in accordance with a general charging pattern (comparative example), and the other battery 2 was repeatedly charged in accordance with the charging pattern according to the present embodiment. The number of repetitions (number of cycles) of charging was set at 100. A degree of progress of deterioration of batteries 2 due to charging was quantitatively evaluated by a rate of change in internal resistance (resistance change rate) of battery 2.

Figure 10:
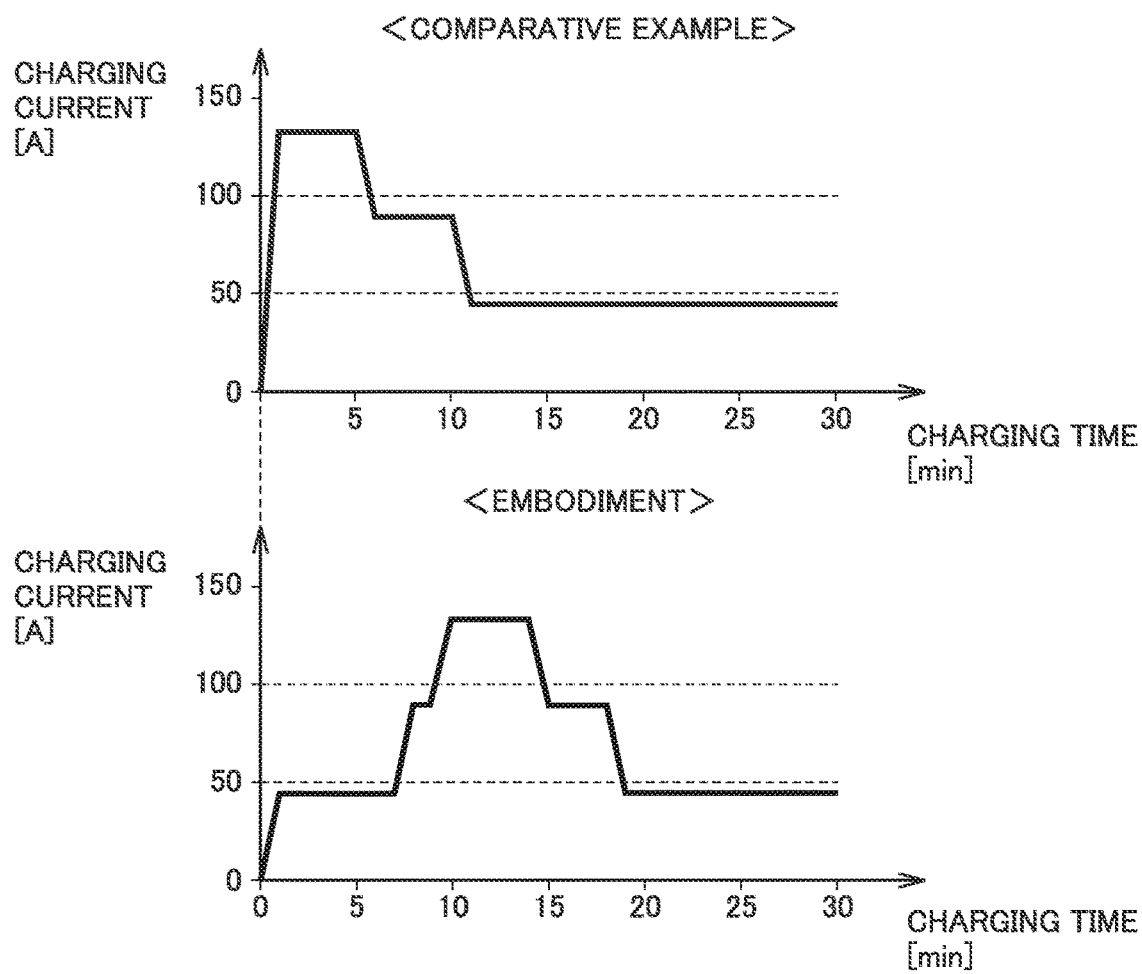
FIG. 10 is a time chart showing charging current patterns used in an evaluation test.

FIG. 10 is a time chart showing the charging current patterns used in the evaluation test. In FIG. 10, the horizontal axis represents the elapsed time from the start of charging of battery 2. The vertical axis in the upper graph represents charging current I to battery 2 in the comparative example, and the vertical axis in the lower graph represents charging current I to battery 2 in the present embodiment. In this example, a value charged to each cell 21 is denoted as charging current I.

Referring to FIG. 10, in the comparative example, charging current I to battery 2 was the largest at the start of charging. Charging current I was gradually (in this example, in a stepwise manner) reduced as charging of battery 2 progressed.

In contrast, in the present embodiment, charging current I to battery 2 was restricted to a relatively small value (not more than 50 A) at the start of charging. Charging in this restricted state was continued for about 7 minutes, and then, charging current I was increased. A maximum value of the current charged to the battery in the present embodiment was equal to a maximum value in the comparative example (about 130 A). Thereafter, as charging of battery 2 progressed, charging current I was reduced similarly to the comparative example.

Figure 11:
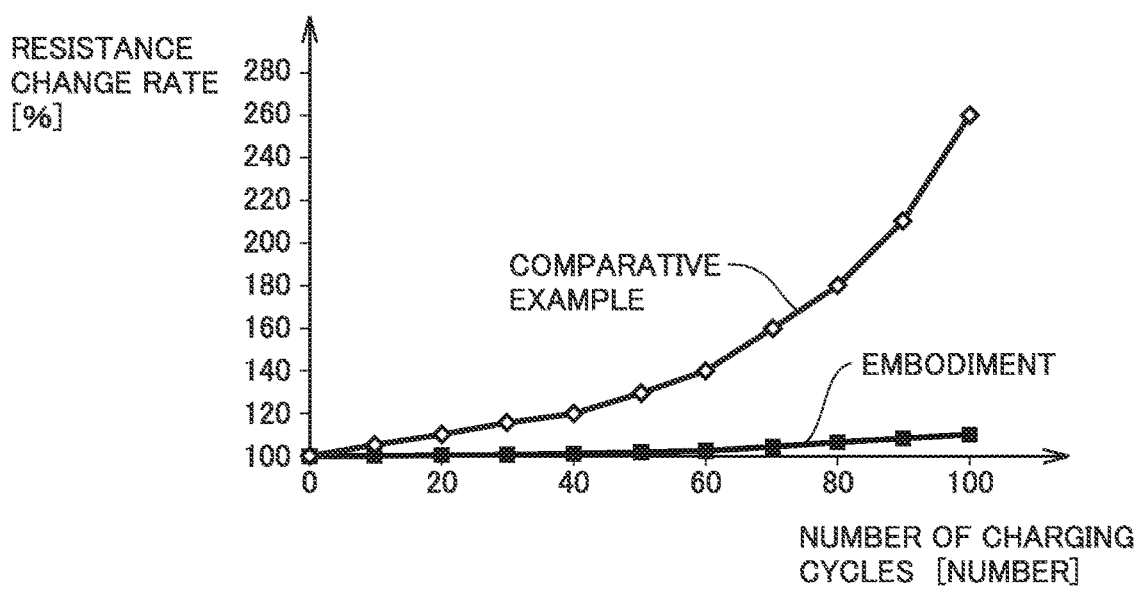
FIG. 11 shows one example of evaluation results of a resistance change rate of the battery when charging is repeated in accordance with the charging current pattern shown in FIG. 10.

FIG. 11 shows one example of evaluation results of the resistance change rate of battery 2 when charging is repeated in accordance with the charging current pattern shown in FIG. 10. In FIG. 11, the horizontal axis represents the number of charging cycles. The vertical axis represents the resistance change rate of battery 2. The resistance change rate refers to a ratio [%] of an internal resistance after the start of charging to an internal resistance before the start of charging.

Referring to FIG. 11, when a comparison is made under a condition that the number of charging cycles is the same, it can be seen that an amount of increase in resistance change rate of battery 2 in the present embodiment is significantly smaller than an amount of increase in resistance change rate of battery 2 in the comparative example. As described below, various evaluation tests were conducted other than the results shown in FIGS. 10 and 11.

Figures 12, 13:
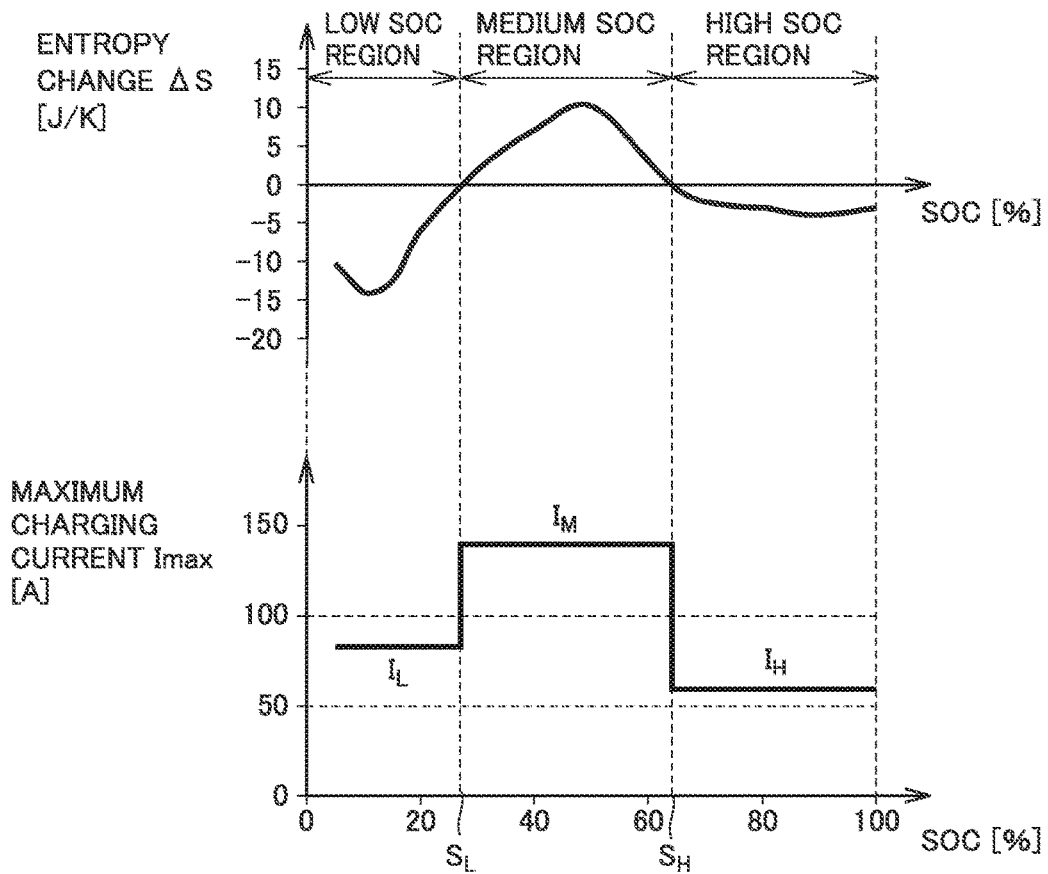
FIG. 12 is a diagram for illustrating a condition of the evaluation test.
FIG. 13 shows results of the evaluation test.

FIG. 12 is a diagram for illustrating a condition of the evaluation test. Referring to FIG. 12, in this evaluation test, one charging current (charging current=maximum charging current Imax) to battery 2 was set for each SOC region. In the figure, the charging current in the low SOC region is denoted as IL, the charging current in the medium SOC region is denoted as $I_M$, and the charging current in the high SOC region is denoted as $I_H$. Therefore, the charging current increases in a stepwise manner as the SOC of battery 2 increases with charging. However, it is not essential to increase the charging current in a stepwise manner, and the charging current may be changed smoothly (continuously).

FIG. 13 shows the results of the evaluation test. FIG. 13 shows the current patterns applied to battery 2 and the measurement results of the corresponding resistance change rate of battery 2 for five Examples 1 to 5 in the present embodiment and two Comparative Examples 1 and 2. The charging current in FIG. 13 refers to a value obtained by converting the charging current to battery 2 (see the vertical axis in FIG. 12) into a C rate.

Referring to FIG. 13, in Comparative Examples 1 and 2, when entropy change ΔS of battery 2 was negative (when the SOC of battery 2 was included in the low SOC region or the high SOC region), the resistance change rate of battery 2 after the 100 charging cycles increased significantly because the charging current to battery 2 was set to be large. Specifically, when charging current I to battery 2 was equal to or greater than 2.0 C, the amount of increase in resistance change rate of battery 2 was particularly large and reached about 250% (243% or 264%).

In contrast, in Examples 1 to 5, when entropy change ΔS of battery 2 was positive (when the SOC of battery 2 was included in the medium SOC region), the C rate of the charging current (=maximum charging current Imax) to battery 2 was set to be equal to or greater than 1.5 C. Furthermore, the charging current to battery 2 when entropy change ΔS was positive was set to be 1.25 or more times as large as the charging current to battery 2 when entropy change ΔS was negative. This made it possible to keep the resistance change rate of battery 2 at approximately 110% while reducing the charging time.

As described above, in the present embodiment, maximum charging current Imax to battery 2 is determined in accordance with the SOC of battery 2. Since the relationship between the SOC and entropy change ΔS of battery 2 (see FIG. 7) is preliminarily obtained, determination of maximum charging current Imax in accordance with the SOC of battery 2 means determination of maximum charging current Imax in accordance with entropy change ΔS of battery 2. When entropy change ΔS is positive, reaction Gibbs energy ΔG is negative (refer to Equation (5) above). Therefore, in the SOC region where entropy change ΔS is positive, the intercalation reaction is likely to progress and an increase in internal resistance of battery 2 is less likely to occur. Therefore, as compared with the SOC region (low SOC region or high SOC region) where entropy change ΔS of battery 2 is negative, in the SOC region (medium SOC region) where entropy change ΔS of battery 2 is positive, deterioration of battery 2 can be suitably suppressed, even when maximum charging current Imax to battery 2 is set to be large.

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A method for charging a battery that is a non-aqueous electrolyte secondary battery, the method comprising:
   estimating an SOC of the battery based on at least one of a voltage and a current of the battery; and
   based on a relationship between the SOC of the battery and an entropy change of a battery reaction of the battery, determining a charging current to the battery in accordance with the SOC of the battery, wherein
   the charging current to the battery when the entropy change of the battery is a first value is larger than the charging current when the entropy change of the battery is a second value smaller than the first value.

2. A charging system comprising:
   a battery that is a non-aqueous electrolyte secondary battery;
   a charging device that charges the battery; and
   a controller that controls a charging current to the battery, wherein
   the controller is programmed to:
   estimate an SOC of the battery based on at least one of a voltage and a current of the battery; and
   based on a relationship between the SOC of the battery and an entropy change of a battery reaction of the battery, determine a charging current to the battery in accordance with the SOC of the battery, wherein
   the charging current to the battery when the entropy change of the battery is a first value is larger than the charging current when the entropy change of the battery is a second value smaller than the first value.

* * * * *